Figure 2:
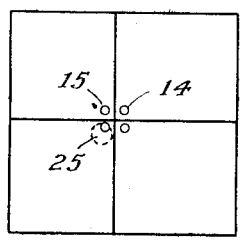

J. O. OLSON & C. S. CARLBERG.
HEATING SYSTEM.
APPLICATION FILED APR. 10, 1911.

1,065,074.

Patented June 17, 1913.
3 SHEETS—SHEET 1.

Witnesses:
Thos. Lagaard.
H. Q. Bowman.

Inventors:
John O. Olson.
Carl S. Carlberg.
By F. A. Whiteley
their Attorney.

J. O. OLSON & C. S. CARLBERG.
HEATING SYSTEM.
APPLICATION FILED APR. 10, 1911.

1,065,074.

Patented June 17, 1913.
3 SHEETS—SHEET 2.

Witnesses:

Inventors:
John O. Olson.
Carl S. Carlberg.
By F. A. Whiteley
their Attorney

J. O. OLSON & C. S. CARLBERG.
HEATING SYSTEM.
APPLICATION FILED APR. 10, 1911.

1,065,074.

Patented June 17, 1913.

3 SHEETS—SHEET 3.

Witnesses:
Theo. Lagaard
H. A. Bowman

Inventors:
John O. Olson.
Carl S. Carlberg.
By F. A. Whiteley
their Attorney.

UNITED STATES PATENT OFFICE.

JOHN O. OLSON, OF ST. PAUL, AND CARL S. CARLBERG, OF MINNEAPOLIS, MINNESOTA, ASSIGNORS TO SPIRAL RADIATOR COMPANY, OF ST. PAUL, MINNESOTA, A CORPORATION OF ARIZONA.

HEATING SYSTEM.

1,065,074. Specification of Letters Patent. Patented June 17, 1913.

Application filed April 10, 1911. Serial No. 620,103.

*To all whom it may concern:*

Be it known that we, JOHN O. OLSON and CARL S. CARLBERG, citizens of the United States, residing at (1) St. Paul and (2) Minneapolis, in the counties of (1) Ramsey and (2) Hennepin and State of Minnesota, have invented certain new and useful Improvements in Heating Systems, of which the following is a specification.

The object of our invention is to provide a simple, economical system of heating which will be inexpensive to install and capable of heating a comparatively large space in a short time, and which will heat each room of any building by convection of the heat units to the air of the room directly by the circulation of such air in each room through heat delivering units of our system.

A further object is to provide a heating system, including a furnace and circulating system for a heat-conveying medium, having means in said furnace for causing the medium to absorb rapidly the heat units generated and means in each room to be heated to transfer said heat units to the air of the room with equal rapidity.

A further object is to provide improved heat delivering means, through which a circulation will be established through the room, causing the cold air to be drawn into contact with the heated surface of the heat delivering means and from thence discharged into the upper part of the room, and caused to circulate throughout the same.

A further object is to provide a heating system in which either hot water or steam may be utilized as the heat conveying medium.

In the heating systems employed at the present time the different rooms of a building are warmed either by heat generating devices within the rooms, such as stoves, or by heat which is generated at some distant point and absorbed at such point by a medium by means of which the heat is conveyed to the different rooms and delivered to the rooms through apparatus especially adapted for that purpose. The heat conveying and delivering medium may be air heated directly at the furnace which will flow into the rooms to be heated warming the same by direct convection and intermingling of said heated air with the air of the room. Such air may be heated by being admitted from out of doors directly to an envelop or container in which the furnace is located and be caused to flow by gravity to various rooms of the building, in which case wind pressure is found invariably to cause an unequal distribution of said heated air to various rooms in the building and consequent inequalities in the temperatures of said different rooms. Said air may also be driven by power-operated fans through heated coils or other devices forming a battery for secondary radiation and flows into the different rooms under pressure. This will obviate to some extent the disadvantage and inequalities of heating resulting from wind pressure, but involves so much cost in maintaining an engine or motor to operate the fans as to be applicable only to buildings in which heating and ventilating must be carried on upon a comparatively large scale. It is also true that a large amount of heat is lost in the long air passages of such systems.

Another means of conveying heat from the distant generator to the rooms to be heated is by means of hot water or steam heated at the generator and conducted to devices located in each room to be heated from which the heat is delivered by direct radiation. These systems in the main work more advantageously than the systems involving heating by direct air convection. But the radiators used in such systems are of cast metal and do not provide for circulation of all of the heat-conveying medium through all parts of said radiators. In fact there is practically no flow, properly speaking, at all, but a slow interchange of the hot and colder parts of the heating medium in different parts of the radiator, so that these systems are not quickly responsive to the condition of the heat generator, but are slow in reaching a heat-delivering condition and correspondingly slow in cooling when the room becomes too warm, thereby causing much discomfort. The direct radiators also have the disadvantage of stoves that their hot surfaces are practically all exposed so that the portion of the room immediately adjacent said radiator will be uncomfortably hot and warmer than the other portions of the room, and this direct radiation has an extremely injurious effect upon any furniture which of necessity must be placed near such radiator. The direct radiators at present employed are not adapted to create any substantial circulation of air within the rooms and therefore it is necessary in order to heat the rooms properly by such means to place said radiators next to the outside walls of the house or building and beneath the windows thereof, where the air made cold by radiation of the heat of the room through the partitions and windows will descend upon the radiator to be heated thereby. This arrangement necessitates long runs of pipe and expensive connections, and also places the radiators where they occupy the most valuable space in the room, that immediately in front of the windows.

Our invention combines features of advantage both of the direct radiation systems and the air convection systems and overcomes the defects above enumerated inherent in both of said types of heating systems.

It is a fundamental principle of our heating system that the heat for each room is delivered thereto by means of direct convection of the air of the room through a heat delivering device located in said room and forming a part of a circulating system through which either steam or hot water is caused to flow, said circulating system including a heat absorbing member located wholly within the walls of the heat generating furnace. These heat delivering units are of such construction that the air of each individual room is caused to circulate through said units and throughout the room by gravity, but to circulate with such rapidity and be brought in such large and close contact with the heating medium as to withdraw the heat units therefrom with correspondingly great rapidity. Since the room is heated by air convection and circulation through the room, it has been found entirely practicable to place the heat delivering members adjacent the inner walls of the room so that in a house of ordinary size and construction all of said heat delivering units will be located almost directly above the furnace and in the most inconspicuous and little used corners of the room, thus at the same time diminishing the cost and difficulties of installation and obviating the inconvenience and unsightliness attendant upon the disposition of radiators beneath the windows of the rooms. Also, with this system of individual convection in each room, but one heat delivering member will be required for each room instead of the two or more radiators usually found necessary in the direct radiation systems, while from the fact that the convection circulation is set up individually with the air of each room, wind pressure will have no effect upon the distribution of heat to said room. Moreover, our heat delivering units are preferably designed to be so constructed as to present no exposed surfaces for direct radiation, so that the temperature is no higher near by than at distant portions of the room, and furniture may be placed in close proximity or directly against said heat delivering means without any possibility of injury thereto. It is also practicable and is contemplated as a feature of our invention to arrange fresh air ducts within the floors or partitions of the building and extend the same so as to open directly beneath the heat delivering devices. The flow of air through said conduits can be regulated by means of valve closures of the ordinary register type. Fresh air will thus be admitted from out of doors to a point directly beneath the heat delivering members from which it will be caused to ascend therethrough being heated in its course and providing a simple and practicable means of ventilating the different rooms.

The principle involved in our heating system that the heat delivering units shall cause the heating medium to circulate so as to flow in an attenuated and extended form for rapid extraction of the heat units therof by the circulation of air therethrough requires that the circulation of said heat conveying medium shall be relatively rapid, and therefore that said circulating system should provide means within the furnace adapted to hold said rapid circulating medium in such heat absorbing relation to the gases of combustion within the furnace that the heat units generated by combustion of fuel therein may be absorbed with a rapidity corresponding with the rapid circulation of the medium and the quick withdrawal of the heat units thereof in the heat delivering devices aforesaid.

Our particular combination of heat absorbing and heat delivering means which we have devised for effecting the before enumerated results of our heating system will now be specifically described in relation to the accompanying drawings, forming a part of this specification, which illustrate the application of our invention in one form.

Figure 1:
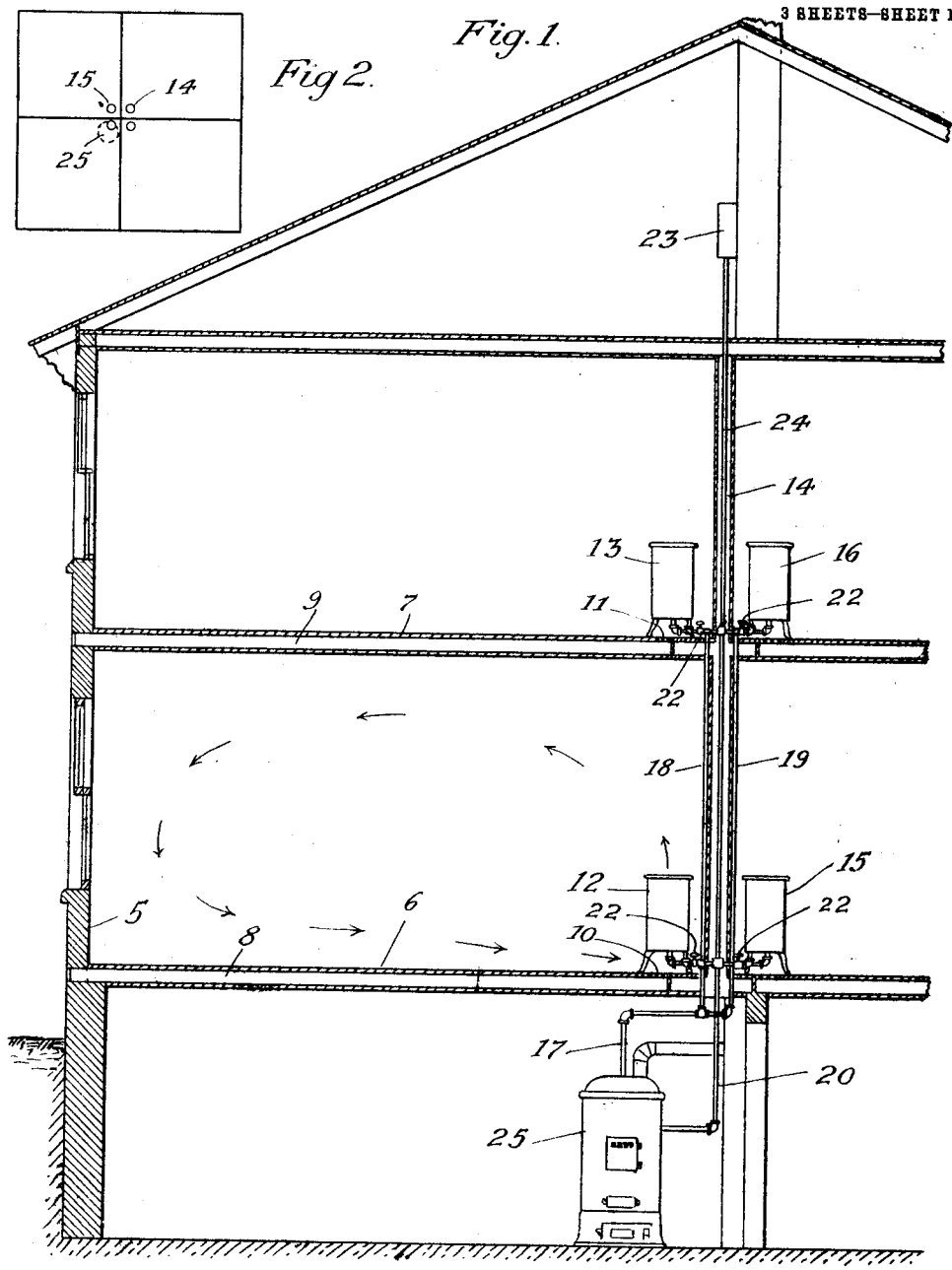
Figure 3:
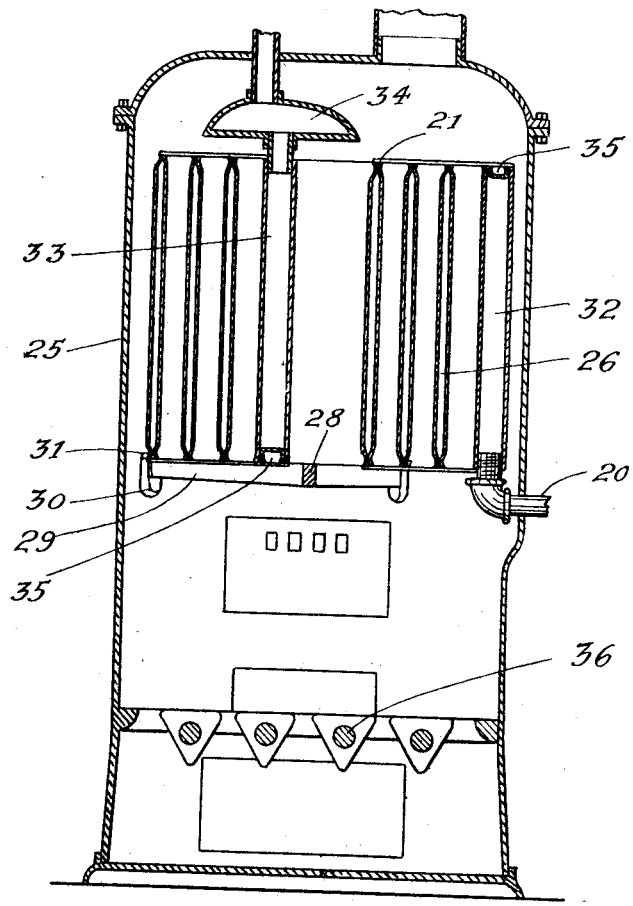
Figure 4:
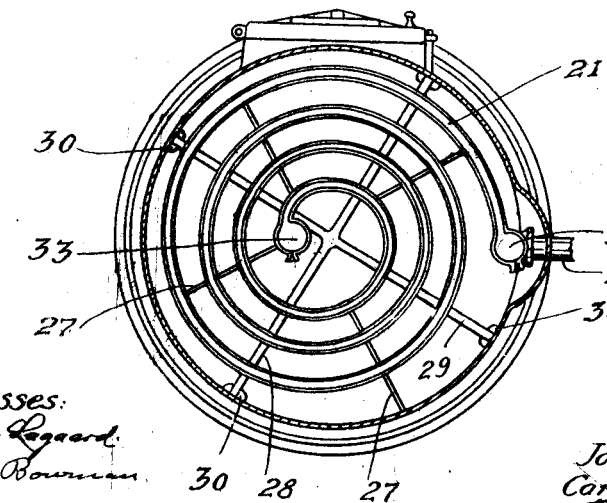
Figure 5:
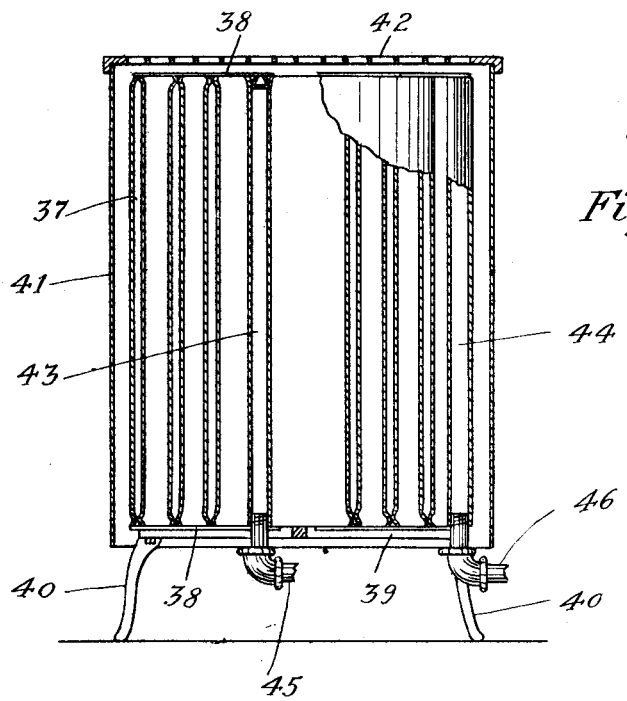
Figure 6:
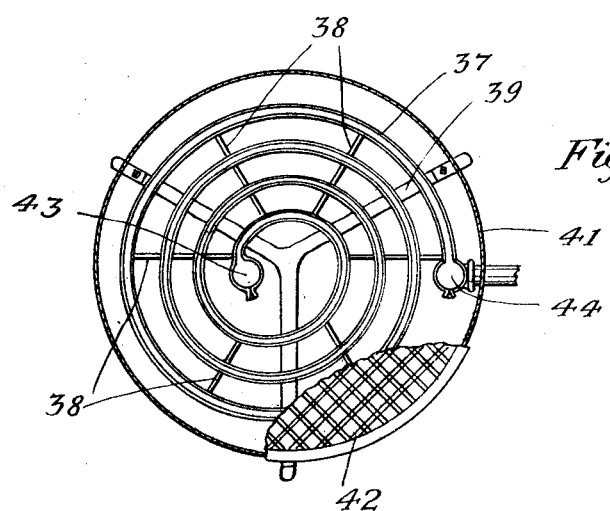

Figure 1 is a sectional elevation of a dwelling, illustrating our invention installed therein, and Fig. 2 is a diagrammatic plan. Fig. 3 is a vertical, sectional view of a boiler. Fig. 4 is a horizontal, sectional view of the same. Fig. 5 is a vertical, sectional view of one of our heat-delivering units. Fig. 6 is a sectional view, showing the construction of heat-delivering members.

In the section of the dwelling shown in Fig. 1, 5 is an outside wall, 6 and 7 are floors having fresh air ducts 8 and 9, respectively, which open at 10 and 11 beneath heat delivering members 12 and 13 placed adjacent a central partition 14. Other heat delivering members 15 and 16 are shown on the opposite sides of said partition, all of said heat delivering units forming parts of the circulating system for the heat conveying medium, of which the risers 17, 18 and 19, return pipe 20, and heating coil 21, within the furnace, shown in Figs. 2 and 3, and the short connections from said heat delivering units to said risers and return pipes, form the remaining portions. Valves 22 of usual construction are provided by means of which the individual heat delivering units may be cut off from the circulating system, and where it is desired to use hot water as a circulating medium the usual expansion tank 23 is provided in the attic of the building connected by means of a pipe 24 with the return pipe 20. As shown in Fig. 2 the heat delivering units are preferably grouped adjacent the intersection of the partitions substantially directly above the furnace, so that the supply and return pipes of the circulating system form the shortest and most direct possible connection between the heat delivering and heat absorbing members.

The heating coil 21 within the furnace casing 25 comprises a closed continuous spiral chamber 26 of relatively very shallow and wide cross-section formed of comparatively thin sheets of metal spaced apart the desired distance and secured at the edges in a steam-tight manner by a special seam formed of metal welded directly to the edges of both of said plates. The coils of the spiral are held properly spaced from one another by means of bars 27 welded to the seams at the edges of said coils. The coil 21 rests upon a grid formed of two cross-bars 28, 29 resting upon lugs 30 formed on the inside of the furnace casing 25, said coil being held positioned upon said grid by means of upstanding lugs 31 on the grid. The coil 21 is provided at the outer and inner ends thereof with expanded portions 32 and 33, respectively, formed directly of the metal sheets used for the inner and outer walls of the aforesaid spiral chamber and hence connecting throughout its length directly with the interior of said spiral chamber. The expanded portion 32 has connected at the bottom thereof the return pipe 20 and the expanded portion 33 is connected either directly, or through a drying chamber 34 if steam is to be used as the heat conveying medium, as desired, with the riser 17, the other ends of the portions 32 and 33 being closed by caps 35, which may be sheet metal welded therein or ordinary plugs, as desired. It will thus be seen that the coil 21 provides a part of the circulating system for the heat conveying medium entirely within the walls of the furnace and surrounded at every point by passages for the hot gases of combustion, said coil being adapted to hold the heat conveying medium within the furnace in an attenuated and expanded condition, the thin walls of the aforesaid spiral chamber and the fact that the heat conveying medium must circulate throughout the entire course of said spiral chamber placing the same in relation to the hot gases of combustion so that the heat will be absorbed therefrom with extreme rapidity. The water may enter the chamber at 32 practically cold and although moving with great speed through the spiral chamber will pass out through the riser 17 very highly heated even though but a comparatively low fire is burning on the grate 36. This feature not only induces the rapid circulation which is essential to the proper working of our system but has been found in practical operation of the system to be a very great economizer of fuel, since nearly all of the heat units are extracted from the heat conveying medium in the heat delivering means and said medium entering the heating chamber at a very reduced temperature a relatively large heat absorbing surface of low temperature is presented to the hot gases of the furnace.

The heat delivering members comprise a spiral chamber 37, in connection with the circulating system and through which the heat conveying medium flows, of identically the same form and structure as the spiral chamber 21 within the furnace, except that the sheets of metal forming said spiral chamber 37 may be placed somewhat closer together. It may be stated in this connection that the showing of the spiral chamber 21 within the furnace is to a large extent diagrammatic as there will be a very much larger number of coils in ordinary practice than are shown in the drawings, the number and extent of the coils forming the spiral chamber for the furnace being determined by the size of the building to be heated, and being proportioned to the total radiating surface of all of the heat delivering units used in the entire system. That is, the number of square feet of heat absorbing surface in the circulating system within the furnace will bear a fixed ratio to the number of square feet of heat delivering surface in all of the heat delivering units of the system. The spiral chambers 37 have the coils thereof held in properly spaced relation by means of bars 38 welded to the seams at the edges of said coils, and said chamber is supported in vertical position upon a tri-bar standard 39 having legs 40 for holding the same the proper distance above the floor, the chamber being preferably surrounded by a casing 41 also supported upon the standard 39, said casing 41 in turn supporting a grill 42 extending above the top of the spiral chamber. The spiral chamber 37 is provided with expanded passages 43 and 44 formed directly by extensions of the walls, and opening throughout their length into the inner and outer ends, respectively, of said spiral chamber, the passage 43 being connected at the lower end by a pipe 45 to one of the risers 18 or 19 and the passage 44 being similarly connected by a pipe 46 with the return pipe 20, thus placing said spiral chamber within so that it forms a part of the circulating system for the heat conveying medium.

In operation, when a fire is started in the furnace, the heat conveying medium, whether water or steam, will absorb heat with great rapidity from the gases of combustion, and circulation will immediately be started throughout the circulating system. The spiral chamber in the furnace, being less than an inch deep, and the smaller spiral chambers of the heat delivering members are capable of holding but a small quantity of the heat conveying medium so that the same will become heated almost instantaneously after the starting of the fire in the furnace, and the heat delivering members will respond at once in furnishing heat to the different rooms of the building. This is one of the novel features of our heating system of the utmost importance. We employ the principles of the instantaneous water heaters or steam generators to a heat conveying system so that the response in heating the rooms of the building is practically as quick as is the case when a fire is started in a sheet-iron stove directly within the room to be heated, a feature which we believe is not present in any other heating system in which the heat is generated at a distance from the room to be heated and conveyed thereto by some suitable medium. It is the combination of a thin-walled, large-surfaced and small-volumed heat absorbing member adapted to be wholly surrounded by the hot gases of combustion within the furnace with similarly constructed heat delivering members in each room to be heated, adapted to be surrounded at all points by ascending passages through which the cold air of the room will flow to extract the heat units from the heat conveying medium within said members and distribute the heat through the room by convection, which makes this result possible.

We claim:

1. A gravity heating system comprising a furnace and a circulating system extending therethrough for a heat-conveying medium, said circulating system including means for constraining said medium to flow in a relatively wide and thin sheet within the furnace for absorbing heat units rapidly, said means causing said sheet to be of great length and being adapted to be surrounded at all points by the hot gases of combustion, said circulating system also including heat delivering means in each room to be heated, said heat delivering means constraining said medium to flow in a relatively wide and thin sheet and causing said sheet to be of great length and being surrounded at all points by unobstructed ascending passages through which the colder air of the room may rise and extract the heat units from said medium and convey the same uniformly throughout the room.

2. A gravity heating system comprising a furnace and a circulating system extending therethrough for a heat-conveying medium, said circulating system including means for constraining said medium to flow in a relatively wide and thin sheet within the furnace for absorbing heat units rapidly, said means causing said sheet to be of great length and being adapted to be surrounded at all points by the hot gases of combustion, said circulating system also including heat delivering means in each room to be heated, said heat delivering means constraining said medium to flow in a relatively wide and thin sheet and causing said sheet to be of great length and being surrounded at all points by unobstructed ascending passages through which the colder air of the room may rise and extract the heat units from said medium and convey the same uniformly throughout the room, said circulating system, and the heat absorbing and heat delivering means therein being constructed and connected so that the flow of the heat-conveying medium therethrough will be effected by gravity.

3. A gravity heating system comprising a furnace and a circulating system extending therethrough for a heat-conveying medium, said circulating system including within the furnace a continuous spiral chamber formed of thin sheets of metal and surrounded at all points by passages for the hot gases of combustion, said sheets of metal being connected and spaced apart so as cause the heat-conveying medium to flow in a relatively wide and thin sheet of great length within said furnace for absorbing heat units rapidly, said circulating system also including in each room to be heated a heat delivering member provided with a closed continuous spiral chamber formed of thin sheets of metal spaced apart and secured together so as to cause said heat-conveying medium to flow in a relatively wide and thin sheet, the walls of said spiral chamber being surrounded at all points by unobstructed ascending passages through which the colder air of the room may rise and extract the heat units from said medium and distribute the same uniformly through the room.

4. A gravity heating system comprising a heat generator and a circulating system extending through said generator, through all parts of which all of the heat-conveying medium is constrained to flow in a continuous stream, said circulating system including a heat delivering member consisting of thin sheets of metal secured together at the edges thereof and bent to form a vertically positioned spiral chamber of uniform cross-section opening into expanded vertical passages through the whole extent of each end of said spiral chamber, said passages connecting said chamber with said circulating system, the coils of said spiral being spaced apart and the whole being inclosed within an outer casing so that said chamber is surrounded at all points with unobstructed ascending passages through which the colder air of the room may rise and extract the heat units from said medium and convey the same uniformly throughout the room.

5. A gravity heating system comprising a heat-generator and a circulating system extending through said generator, through all parts of which all of the heat-conveying medium is constrained to flow in a continuous stream, said circulating system including a heat delivering member consisting of a pair of thin sheets of metal secured together at the edges thereof and bent to form a spiral chamber of uniform cross-section opening into vertical enlarged passages through the whole extent of each end of said spiral chamber, said vertical passages being connected with said circulating system so as to make said spiral chamber a part thereof, and the coils of said spiral being held spaced apart to form between said coils unobstructed ascending passages through which the colder air of the room may rise and extract the heat units from said medium and convey the same uniformly throughout the room.

6. A gravity heating system comprising a heat generator and a circulating system for a heat conveying medium extending into all of the rooms to be heated, part of said circulating system being within the heat generator everywhere surrounded by the hot gases of combustion and through which part all of said medium is caused to flow, and heat delivering means in said circulating system located in each room consisting of a pair of thin sheets of metal secured together at the edges thereof and bent to form a spiral chamber of uniform cross-section opening into vertical enlarged passages through the whole extent of each end of said spiral chamber, each of said vertical passages being continuous with and formed of the same sheets of metal as the walls of said spiral chamber and being connected at the lower ends thereof with the supply and return pipes, respectively, of the circulating system so as to make said spiral chamber a part of said circulating system, and the coils of said spiral being held spaced apart to form between said coils unobstructed ascending passages through which the colder air of the room may rise and extract the heat units from said medium and convey the same uniformly throughout the room.

In testimony whereof we affix our signatures in presence of two witnesses.

JOHN O. OLSON.
CARL S. CARLBERG.

Witnesses:
   H. A. BOWMAN,
   F. A. WHITELEY.